Aug. 21, 1962 E. L. LINCOLN, JR 3,050,632
PHOTO-TRANSDUCER SIGNAL COMPRESSOR
Filed April 21, 1959

INVENTOR
EDWARD L. LINCOLN, JR.
BY John J. Rogan
ATTORNEY 3,050,632

PHOTO-TRANSDUCER SIGNAL COMPRESSOR

Edward L. Lincoln, Jr., Brooklyn, N.Y., assignor, by mesne assignments, to Litton Systems, Inc., Beverly Hills, Calif., a corporation of Maryland
Filed Apr. 21, 1959, Ser. No. 807,858
2 Claims. (Cl. 250—207)

This invention relates to photo-transducing systems and more especially it relates to signal compression in such systems.

A principal object of the invention is to provide an improved compressor for modulation systems employing a light sensitive signal transducer.

Another object is to provide a novel compressor employing a multiplier phototube as the compression control.

A further object is to provide a novel combination of multiplier phototube which acts as a photo-signal amplifier and also as a signal compressor.

A feature of the invention relates to a novel signal compressor for a light-wave signal transducing system employing a multiplier phototube having a series of dynodes and at least one output anode in combination with circuit arrangements for controlling the compression characteristic by means of negative feed-back derived from the anode current of the multiplier tube.

Another feature relates to an improved compressor having a logarithmic compression characteristic utilizing a multiplier phototube and negative feed-back controls therefor.

A further feature relates to a novel facsimile transmission system employing a multiplier phototube which acts as a photo-transducing amplifier and also as a logarithmic signal compressor whereby the range of light-wave levels is more easily correlated with the useful range of the associated facsimile equipment.

A still further feature relates to the novel organization, arrangement and relative location and interconnection of parts which cooperate to provide an improved compressor in photo-transducing systems.

In the drawing which shows, by way of example, certain preferred embodiments,

Figure 1:
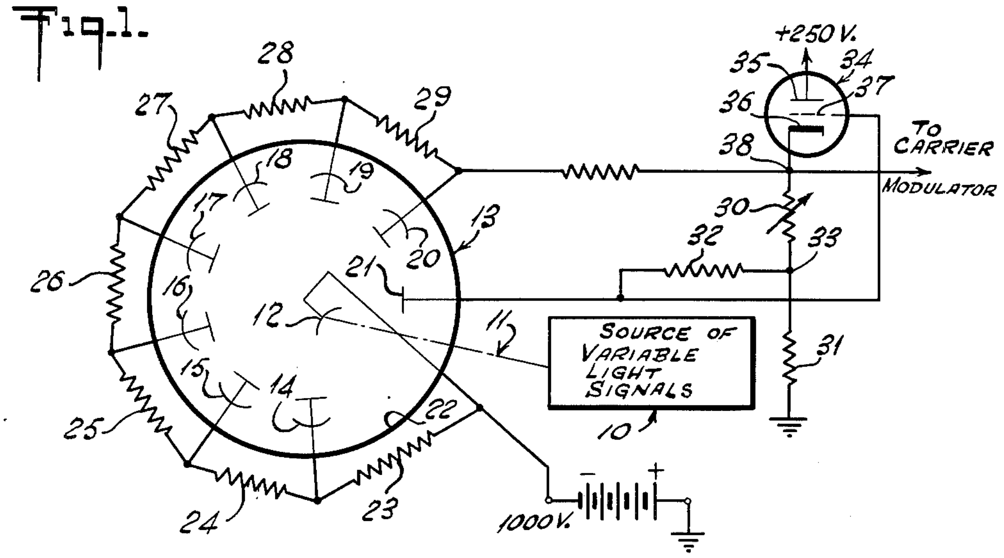
FIG. 1 is a composite schematic circuit and block diagram of a photo-transducing system embodying the invention.

While the invention will be described herein as embodied in a facsimile transmitter, it will be understood that the signal compressing and light signal transducing features of the invention can equally well be applied to other kinds of signal transmitters. Furthermore, only those parts of a facsimile transmitter are shown as are necessary to an understanding of the invention. Thus, in FIG. 1 the block 10 represents any well known source of variable light-wave signals, such for example as the scanning beam 11 of any well known facsimile machine. The light beam 11 which varies in intensity in accordance with the lights and shades of the successive elemental scanned areas of the subject matter to be transmitted is, by well known means, projected on to the primary photo-sensitive cathode 12 of any well known multiplier phototube 13. Since such multiplier phototubes are well known to the art, detailed description is not necessary herein. Thus, the tube 13 may be of the kind having the main primary photo-sensitive emission cathode 12 which is associated with a series of multiplier dynodes 14–20. It will be understood, of course, that any desired number of multiplier dynodes may be used. For example, the tube 13 may be an RCA tube 931A multiplier phototube which has a main cathode and a series of nine separate multiplier dynodes. Associated with the dynodes is an output anode 21. While the drawing shows schematically a multiplier tube with seven dynodes, a greater or less number of such dynodes may be employed. The output voltage at the anode 21 is, as is well known, determined by the intensity of the light beam 11 which strikes the main primary emission cathode 12 to release therefrom photo-electrons which are sucessively multiplied by the various dynodes and result in amplified current variations at the anode 21. As is well understood, the tube 13 comprises the usual evacuated glass bulb or envelope 22 wherein are mounted the cathode 12, the various dynodes and the output anode. The source of direct current voltage schematically represented in the drawing by a battery, for example of one thousand volts, has the negative terminal connected to the primary cathode 12 and to the various dynodes by means of a series of voltage divider bleeder resistances 23, 24, 25, 26, 27, 28, 29. The final dynode 20 is connected through resistors 30, 31 to the positive terminal of the direct current power supply which may be grounded. As a typical example, each of the voltage divider resistances 23–29 may be approximately one hundred thousand ohms, the resistor 30 may be twenty-two hundred ohms and the resistor 31 may be one hundred thousand ohms. The anode 21 is connected through a resistor 32, for example of forty-seven thousand ohms, and thence to the junction point 33 between the resistors 30 and 31. The anode 21 operates at a voltage sufficiently above the positive potential of the final dynode 20 so that substantially all secondary electrons from the dynode are collected by anode 21.

Figure 3:
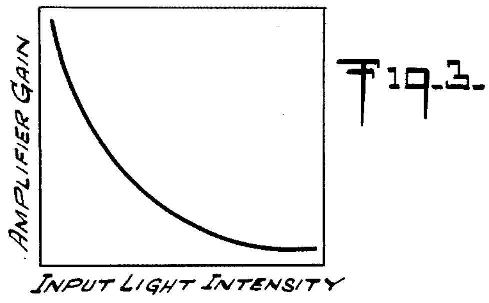
FIG. 3 is a graph of a typical compression characteristic obtainable according to the invention.

As is well known, the amplification of such a multiplier tube is a function of the voltage across the dynode bleeder resistor chain 23–29. In accordance with the invention the amplified signal currents delivered by the anode 21 are used to control the bleeder voltage and consequently to control the amplification factor of the multiplier tube so that that amplification becomes a function of the anode current. Thus, as shown in FIG. 1, the potential of the final dynode 20 will approach that of the anode 21 as the light intensity of the beam 11 decreases. On the other hand, as the intensity of the light beam 11 increases there is produced a voltage drop in the resistor 30 which is comparatively large because of the current drawn by the bleeder resistors, thus causing the positive potential of the dynodes to drop. This decreases the gain of the multiplier tube for the higher values of light intensity in the beam 11. FIG. 3 is a typical graph of the relation between light intensity and the gain of the multiplier phototube.

While the invention is not limited to any particular load circuit to which the anode 21 is connected, as shown in the drawing the load circuit of the anode 21 is constituted of an electron tube 34 of the cathode follower kind. Thus, the anode 35 of that tube may be connected to a suitable positive potential, for example two hundred and fifty volts, and the cathode 36 may be connected to the final dynode 20. The control grid 37 is connected to the anode 21. Consequently the plate-to-cathode current of the tube 34 will be a function of the current from anode 21, and therefore the potential drop across the resistor 30 will likewise vary in accordance with the said anode current. The cathode follower 34 acts as a current amplifier between the anode 21 and the dynode bleeder string. The cathode follower tube 34 appears to the anode 21 like a high impedance, for example of the order of three megohms, while to the dynode string it appears to be of relatively low impedance, for example of the order of five hundred ohms. Therefore, the cathode current of tube 34 develops a negative feed-back voltage at the various dynodes which feed-back voltage is a function of the current from anode 21, thus decreasing the gain of the multiplier tube for the higher values of light signal input from the beam 11. The final dynode 20, which is connected to the cathode 36, may be connected to any well known type of carrier modulator to vary the carrier either in frequency or amplitude in accordance with the potentials developed at the point 38.

With the arrangement above described, the negative feed-back which is derived from anode 21 so as to lower the voltages at the various dynodes produces in effect a logarithmic compression of the volume or output level of the signals appearing at the output point 38. This compression is necessary where the range of light input from the beam 11 is too large for the associated facsimile equipment. For example, the light beam 11 may have as much as 80 db contrast, whereas the facsimile or photo-recorder that is used with the system may be limited to a signal range of 15 db or 20 db. The amount of compression can be varied, for example, by appropriate adjustment of the adjustable resistor 30.

Figure 2:
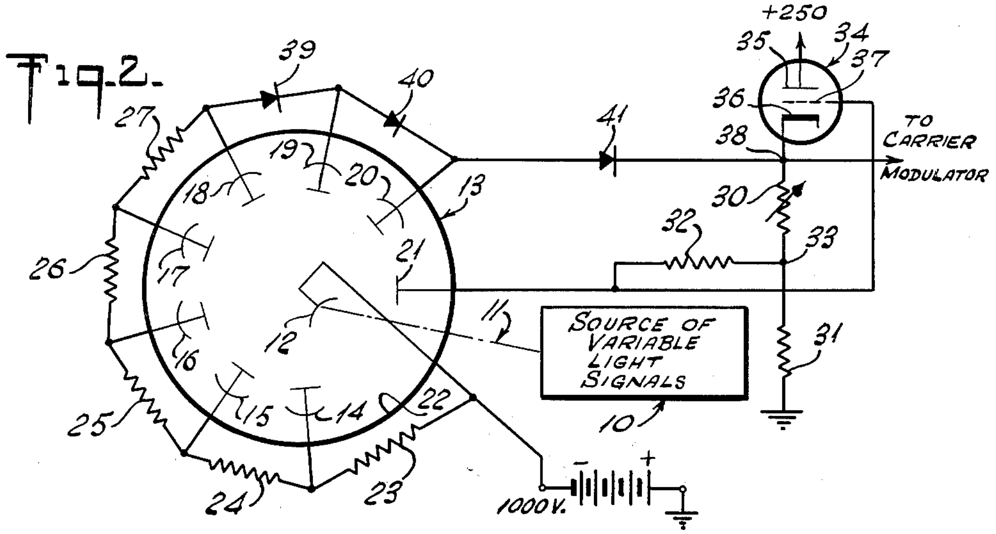
FIG. 2 is a modification of the system of FIG. 1.

In the embodiment of FIG. 1, by reason of the bleeder resistor chain to which the negative feed-back is applied, that feed-back is effective at all the dynode stages. If desired, one or more of the dynode stages may be held at substantially constant gain of maintaining dynode voltage constant while applying the negative feed-back voltage to vary the gain of the remaining dynode stages. Tests indicate that greater stability is obtained if the end stages of the chain, for example, the last two dynode stages 19 and 20, are held at fixed gain while varying the gain at the remaining stages. Thus, as shown in FIG. 2, the last two stages 19 and 20 are held at substantially constant gain by respective diodes 39, 40 and 41. Likewise, these diodes are so connected so as to take advantage of the well known zener voltage breakdown characteristic, and the voltages are chosen so that the drop across each diode remains substantially constant. Thus, each diode acts as an individual voltage regulator to maintain a constant voltage drop across its terminals. Since the gain at each diode is a function of the voltage, then maintaining the dynode voltage constant fixes the gain or amplification. While any well known diodes may be used for this purpose, it has been found that diodes of the semiconductor No. ZA90, manufactured by Hoffman Electronics Corp., are suitable for the purpose, and have an impedance less than approximately five thousand ohms. Consequently the changes in the current at anode 21, resulting from the variations of light beam 11, are fed back in gain varying relation substantially only to the dynodes 14 to 18, while the gain in the last two stages remains constant or substantially so. It will be understood, of course, that the embodiment of FIG. 2 is not necessarily limited to the use of diodes in the last two dynode stages. While it is possible to replace all the bleeder resistances 24–29 of FIG. 1 by such diodes, it has been found that because of the zener knee noise in such diodes it is preferable to use the diodes only in the last few, and preferably not more than in the last three or four dynode stages. It will be understood, of course, that the parts of FIG. 2 which otherwise are the same as and function the same as those of FIG. 1 are designated by the same numerals. It also will be understood that while FIGS. 1 and 2 indicate the output of the amplifier compressor as being applied to a carrier modulator, that output may be applied to any other suitable circuit to be controlled.

Various changes and modifications may be made in the disclosed embodiments without departing from the spirit and scope of the invention.

What is claimed is:

1. A photo-transducing system comprising a multiplier phototube having a plurality of dynodes, an output or load stage including an anode, and a primary cathode adapted to emit electrons when subjected to light or radiant energy, a voltage-dividing bleeder circuit for controlling the potentials of said dynodes, a source of direct current voltage for said bleeder circuit, an electron tube amplifier having an anode, a cathode and at least one control grid and connected as a cathode follower with its cathode-anode path in series relation with said bleeder circuit and said source, and a connection between the anode of the phototube and the control grid of said amplifier to vary the bleeder-circuit voltage and the multiplier phototube gain over a range corresponding to minimum and maximum excitation of the primary cathode of the phototube.

2. A photo-transducing system comprising a multiplier phototube having a primary cathode adapted to emit electrons when subjected to radiation signals, a series of dynodes and a final collector anode, a compression control electron tube of the grid-controlled variable impedance kind, said control tube having a cathode follower load resistor connected to the cathode, a utilization circuit connected to said cathode follower resistor, a bleeder circuit connected in shunt relation to said dynodes, means including a source of direct current and said bleeder circuit for applying accelerating voltages to the respective dynode stages, means connecting said cathode follower resistor in series relation with said direct-current source and said bleeder circuit, and means including a connection between said final collector anode and the control grid of said control tube to effect signal compression by varying the current through said cathode follower resistor and thereby the current in said bleeder circuit.

References Cited in the file of this patent

UNITED STATES PATENTS

| | | |
|---|---|---|
| 2,585,044 | Sanders | Feb. 12, 1952 |
| 2,840,720 | VanRennes | June 24, 1958 |
| 2,846,591 | Valeton | Aug. 5, 1958 |